US010504260B2

(12) United States Patent
Vissicaro et al.

(10) Patent No.: US 10,504,260 B2
(45) Date of Patent: Dec. 10, 2019

(54) KEYBOARD WITH IN-LINE USER CREATED EMOJIS

(71) Applicants: Pegge Vissicaro, Tempe, AZ (US); Ari R. Vissicaro, Tempe, AZ (US); Caio S. Vissicaro, Tempe, AZ (US); Vito Vissicaro, Tempe, AZ (US)

(72) Inventors: Pegge Vissicaro, Tempe, AZ (US); Ari R. Vissicaro, Tempe, AZ (US); Caio S. Vissicaro, Tempe, AZ (US); Vito Vissicaro, Tempe, AZ (US)

( * ) Notice: Subject to any disclaimer, the term of this patent is extended or adjusted under 35 U.S.C. 154(b) by 0 days.

(21) Appl. No.: 15/673,280

(22) Filed: Aug. 9, 2017

(65) Prior Publication Data

US 2018/0047195 A1 Feb. 15, 2018

Related U.S. Application Data

(60) Provisional application No. 62/372,628, filed on Aug. 9, 2016, provisional application No. 62/379,636, filed on Aug. 25, 2016.

(51) Int. Cl.
*G06F 3/0488* (2013.01)
*G06T 11/60* (2006.01)
*H04M 1/725* (2006.01)

(52) U.S. Cl.
CPC .......... *G06T 11/60* (2013.01); *G06F 3/04886* (2013.01); *H04M 1/72552* (2013.01)

(58) Field of Classification Search
CPC ..................................................... G06F 3/0488
See application file for complete search history.

(56) References Cited

U.S. PATENT DOCUMENTS

| | | | |
|---|---|---|---|
| 2016/0259502 A1* | 9/2016 | Parrott | G06F 3/0482 |
| 2016/0306438 A1* | 10/2016 | Kehoe | G06F 3/04886 |
| 2017/0018289 A1* | 1/2017 | Morgenstern | G11B 27/036 |
| 2017/0075878 A1* | 3/2017 | Jon | G06F 17/276 |
| 2017/0083174 A1* | 3/2017 | Tobens, III | G06F 3/0482 |
| 2018/0024726 A1* | 1/2018 | Hviding | G06F 3/04845 |
| | | | 715/204 |
| 2018/0047195 A1* | 2/2018 | Vissicaro | G06T 11/60 |

OTHER PUBLICATIONS

How to make your own emoji—Apr. 24, 2015.*

* cited by examiner

*Primary Examiner* — David E Choi
(74) *Attorney, Agent, or Firm* — Schmeiser, Olsen & Watts, LLP (57) ABSTRACT

A keyboard for use with mobile devices is provided. The keyboard is a touchscreen keyboard that includes user created emojis that can be inserted in-line with text of a native messaging application operating on the mobile device.

11 Claims, 6 Drawing Sheets

KEYBOARD WITH IN-LINE USER CREATED EMOJIS

CROSS REFERENCE TO RELATED APPLICATION[S]

This application claims priority to U.S. Provisional Patent Application entitled "KEYBOARD WITH IN-LINE USER CREATED EMOJIS," Ser. No. 62/372,628, filed Aug. 9, 2016, and claims priority to U.S. Provisional Patent Application entitled "KEYBOARD WITH IN-LINE USER CREATED EMOJIS," Ser. No. 62/379,636, filed Aug. 25, 2016, the disclosures of which are hereby incorporated entirely herein by reference.

BACKGROUND OF THE INVENTION

Technical Field

This invention relates generally to a digital keyboard for use with a mobile device and more particularly to a digital keyboard with in-line user created emojis for use with native messaging applications on a mobile device.

State of the Art

The use of messaging applications and particularly messaging applications that are native to a mobile device are common. Further, as messaging has evolved, users are utilizing emojis to express emotions within the messages that they send. The native messaging applications typically include an emoji keyboard that allows the insertion of emojis in-line with the text of the message that the user is drafting and sending.

These keyboards have their drawbacks. For example, the keyboards do not allow for customization of the emojis. The users are limited to only the emojis pre-created and stored within the keyboard provided by the mobile phone manufacturer. Lacking is the ability for a user to create his own emoji and further to insert the emoji in-line with the text of a message.

Accordingly, there is a need for an improved keyboard with in-line user created emojis.

DISCLOSURE OF THE INVENTION

The present invention relates to a keyboard for use with mobile devices, wherein the keyboard includes user created emojis that can be inserted in-line with text of a native messaging application operating on the mobile device.

An embodiment includes an in-line emoji keyboard for use with mobile devices comprising: a mobile computing device programmed to: activate an in-line emoji keyboard within a native messaging application of the mobile computing device in response to receiving a user selection of the in-line emoji keyboard; enter text using the in-line emoji keyboard; select and enter a user created emoji in-line with the entered text using the in-line emoji keyboard; automatically create an image including the user entered text and user created emoji in-line with the entered text in response to receiving a user selection of create message; automatically paste within the native messaging text area the created image including the user entered text and user created emoji in-line with the entered text; and send the created image including the user entered text and user created emoji in-line with the text using the native messaging application in response to receiving a user selection of sending the message.

Another embodiment includes an in-line emoji keyboard for use with mobile devices comprising: a mobile computing device programmed to: activate an in-line emoji keyboard within a native messaging application of the mobile computing device in response to receiving a user selection of the in-line emoji keyboard; enter text using the in-line emoji keyboard; select and enter a user created pixel art emoji keyboard in-line with the entered text using the in-line emoji keyboard; automatically create an image including the user entered text and user created pixel art emoji in-line with the entered text in response to receiving a user selection of create message; automatically paste within the native messaging text area the created image including the user entered text and user created emoji in-line with the entered text; and send the created image including the user entered text and user created pixel art emoji in-line with the text using the native messaging application in response to receiving a user selection of sending the message.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a keyboard for use with mobile devices, wherein the keyboard includes user created emojis that can be inserted in-line with text of a native messaging application operating on the mobile device.

Figure 1:
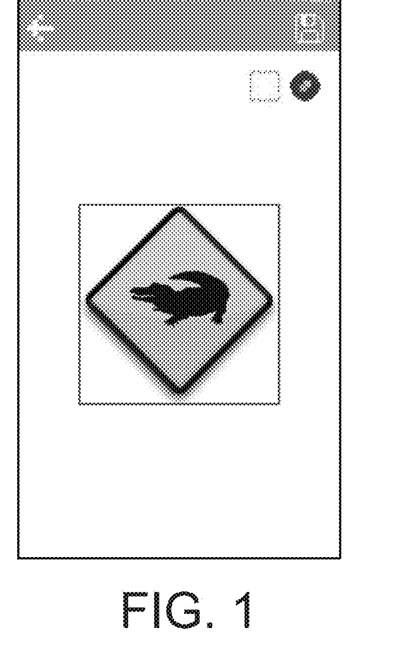
FIG. 1 is a view of a create interface for creating an emoji, in accordance with embodiments.
Figure 2:
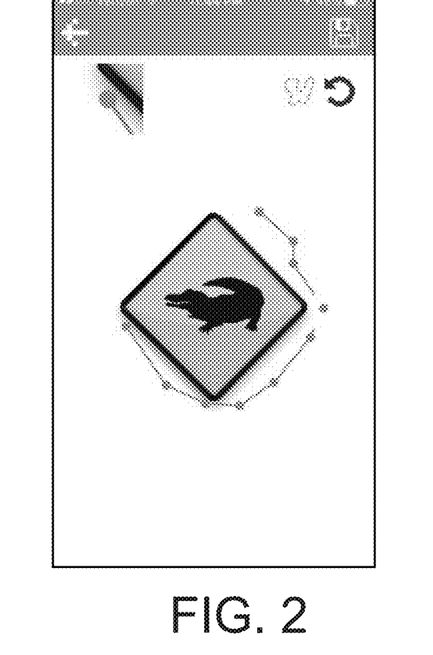
FIG. 2 is a view of a create interface for creating an emoji, in accordance with embodiments.
Figure 3:
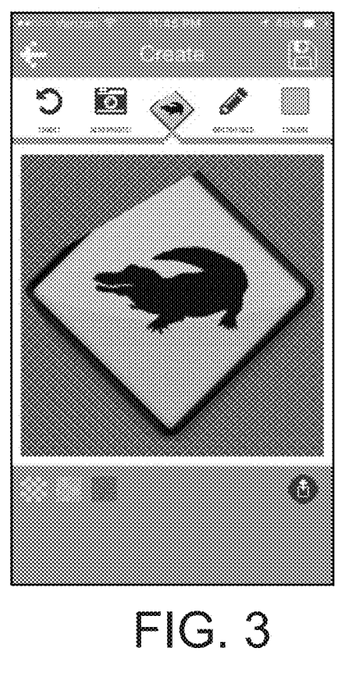
FIG. 3 is a view of a create interface for creating an emoji, in accordance with embodiments.
Figure 4:
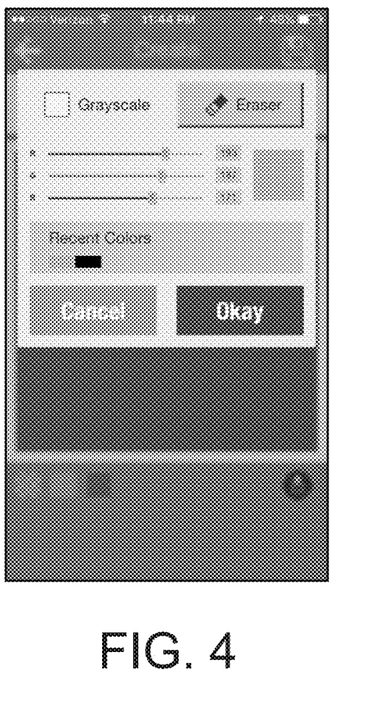
FIG. 4 is a view of a create interface for creating an emoji, in accordance with embodiments.
Figure 5:
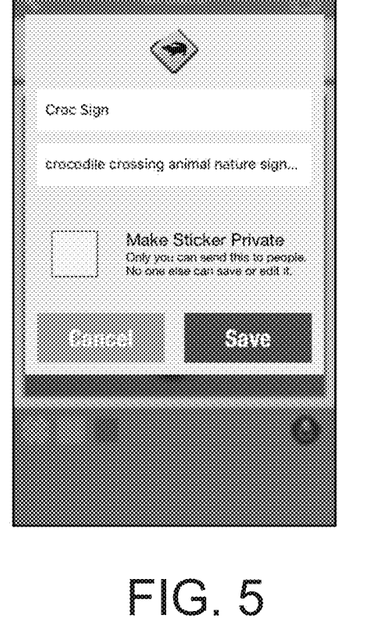
FIG. 5 is a view of a create interface for creating an emoji, in accordance with embodiments.
Figure 6:
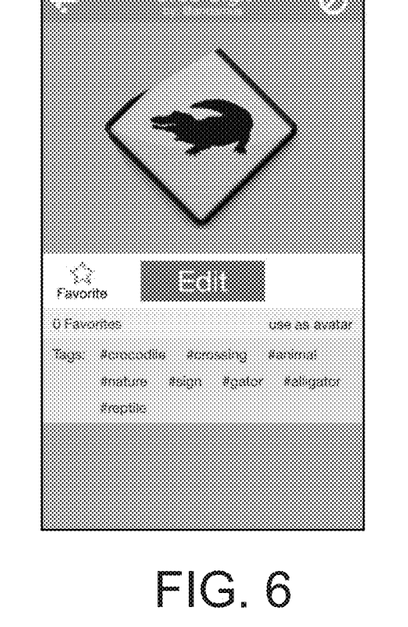
FIG. 6 is a view of a create interface for creating an emoji, in accordance with embodiments.
Figure 7:
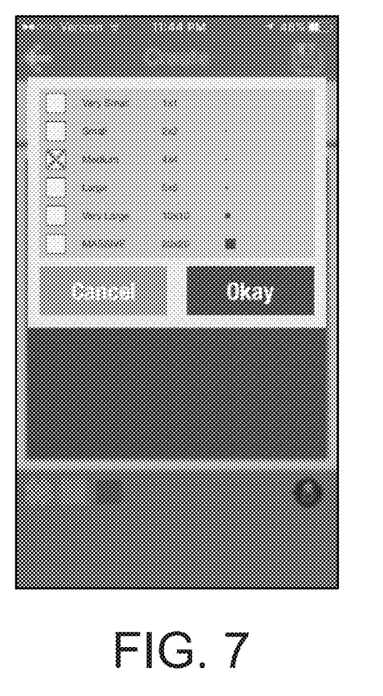
FIG. 7 is a view of a create interface for creating an emoji, in accordance with embodiments.

As shown in FIGS. 1-6, embodiments may include an emoji keyboard system application, wherein the application provides the ability for users to create emojis. The creation of emojis may occur in various ways. One way is to create the emoji by drawing the emoji or utilizing pixel art within the application to create an emoji. Another way, as depicted in FIGS. 1-6 is to open an image in a create interface that allows a user to utilize tools to create an emoji from the opened image. For example and not by way of limitation, a user may open an alligator warning image as shown in FIG. 1. The user may then use a selection tool, such as a free-form selection tool to select a portion of the image as shown in FIG. 2. The user may then crop the image along the selection line as shown in FIG. 3. The user may also adjust the image as shown in FIGS. 4 and 7. The user may then save the file including whether to make it public or private and the saved file may be accessible for later use, as shown in FIGS. 5 and 6. It should be understood that many different ways of creating and saving emojis using the application is possible and the functionality of common photo editors may be utilized within the application for emoji creation. Once the emoji is created and saved, it may be accessible in the application in order to utilize with the inline emoji keyboard.

Figure 8:
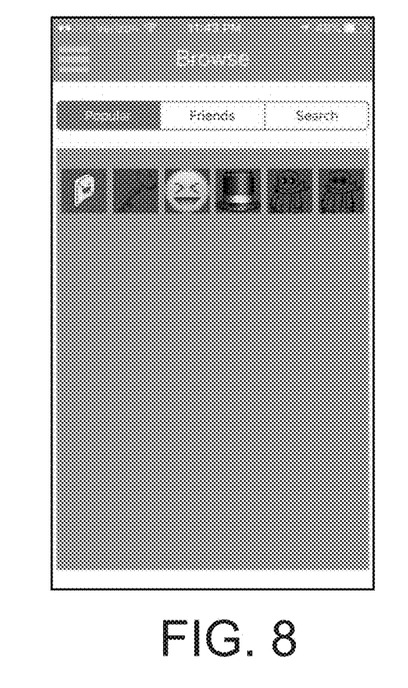
FIG. 8 is a view of a library interface for saved emojis, in accordance with embodiments.
Figure 9:
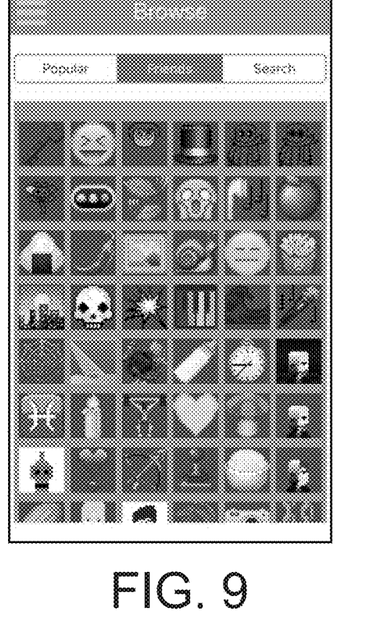
FIG. 9 is a view of a library interface for saved emojis, in accordance with embodiments.

Referring to the drawings, FIGS. 7-9 depict a library interface in accordance with embodiments. The library interface allows a user to search various libraries of images that can operate as emojis. Examples of possible libraries include a popular library that include popular images used by other, a friend's library created by a group of designated friends that utilize the application and a search library of all images available and published using the application.

Figure 10:
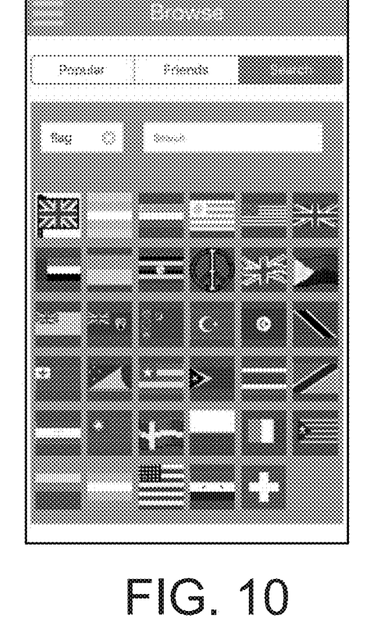
FIG. 10 is a view of a library interface for saved emojis, in accordance with embodiments.
Figure 11:
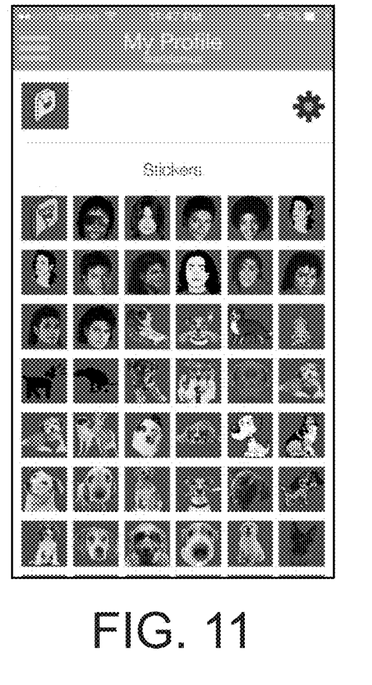
FIG. 11 is a view of a profile interface, in accordance with embodiments.
Figure 12:
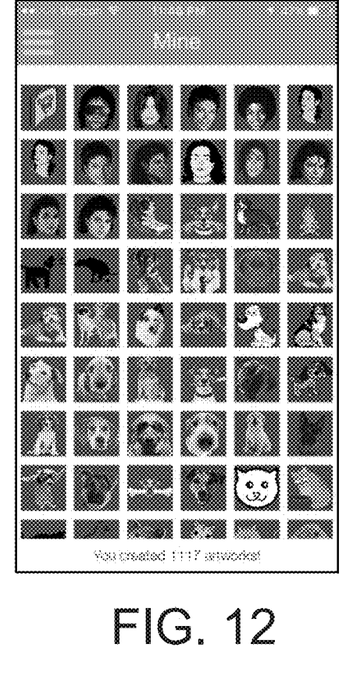
FIG. 12 is a view of a personal library interface for saved emojis, in accordance with embodiments.

The user may access a profile interface, as depicted in FIG. 10, wherein the user may select a saved image as a profile image for sharing using the emoji keyboard system application. The user may also access a personal library, as shown in FIG. 11, wherein the personal library includes all images usable as emojis that the user created using the emoji keyboard system application. To navigate through the emoji keyboard system application, a menu interface, depicted in FIG. 12, is accessible to allow a user to select various interfaces available through the application.

Figure 13:
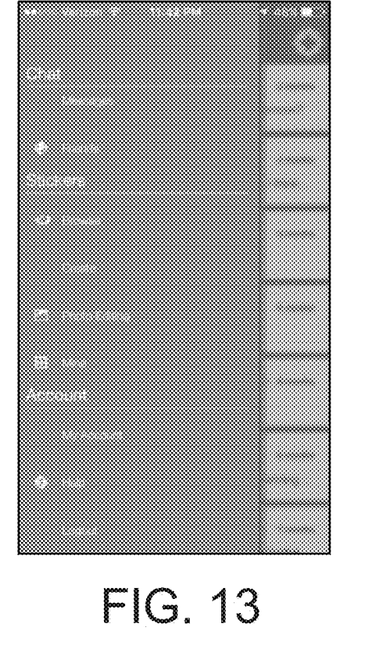
FIG. 13 is a view of a menu list interface for using an emoji keyboard system, in accordance with embodiments.
Figure 14:
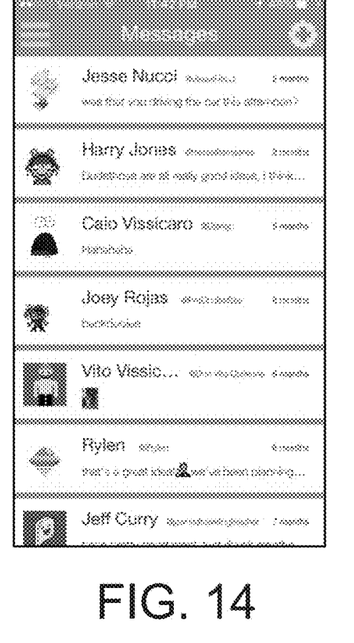
FIG. 14 is a view of a message interface using an emoji keyboard system, in accordance with embodiments.
Figure 15:
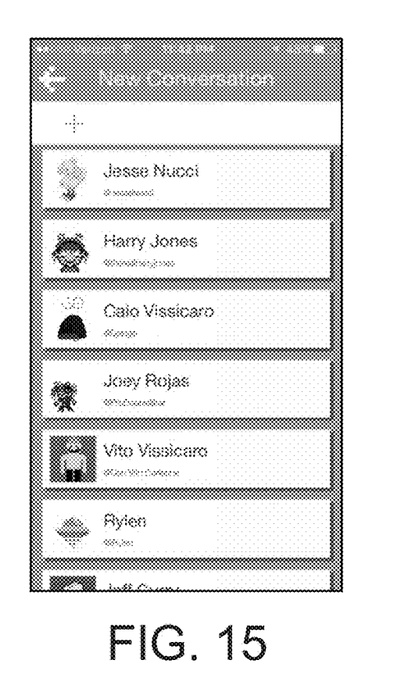
FIG. 15 is a view of a message interface using an emoji keyboard system, in accordance with embodiments.
Figure 16:
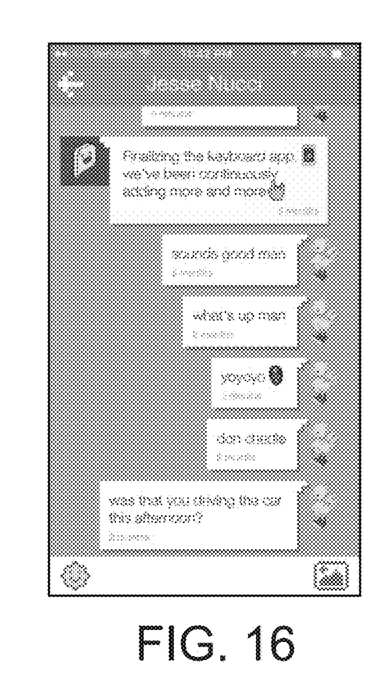
FIG. 16 is a view of a message interface using an emoji keyboard system, in accordance with embodiments.

FIGS. 13-15 depict a message interface within the emoji keyboard system application according to embodiments. The message interface allows the users to communicate with one another through the emoji keyboard system application and to use emojis in the message text. The emojis are inline and the messaging operates in a manner similar to native messaging applications on mobile devices.

Figure 17:
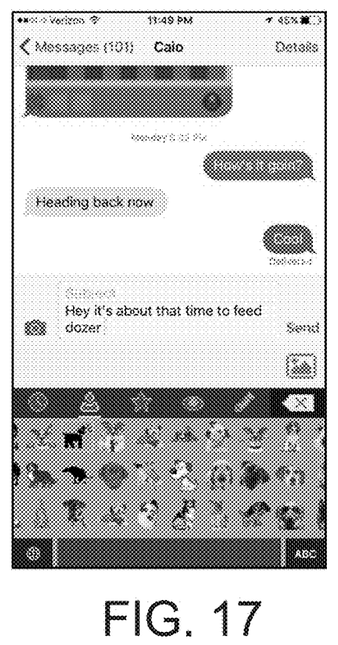
FIG. 17 is a view of a native message interface for using an in-line emoji keyboard, in accordance with embodiments.
Figure 18:
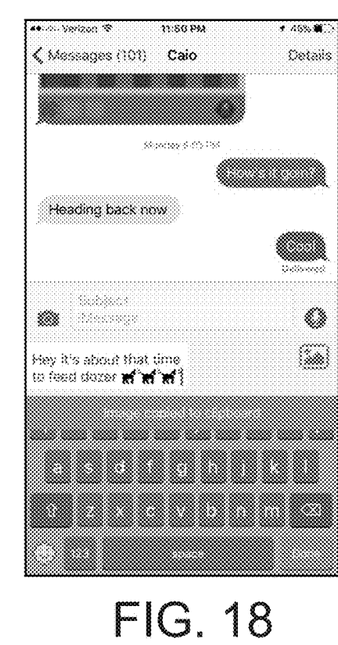
FIG. 18 is a view of a native message interface for using an in-line emoji keyboard with a user created emoji in-line with the text, in accordance with embodiments.
Figure 19:
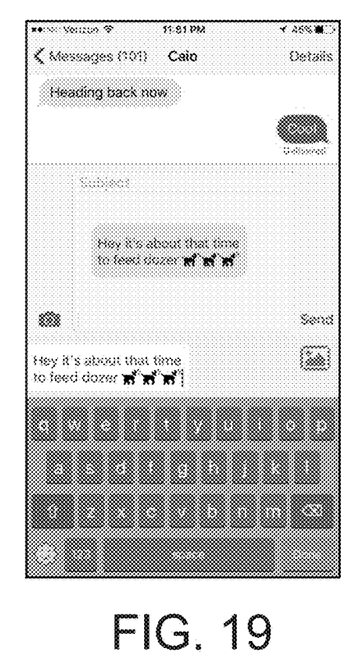
FIG. 19 is a view of a native message interface for using an in-line emoji keyboard with a user created emoji in-line with the text ready to send, in accordance with embodiments.
Figure 20:
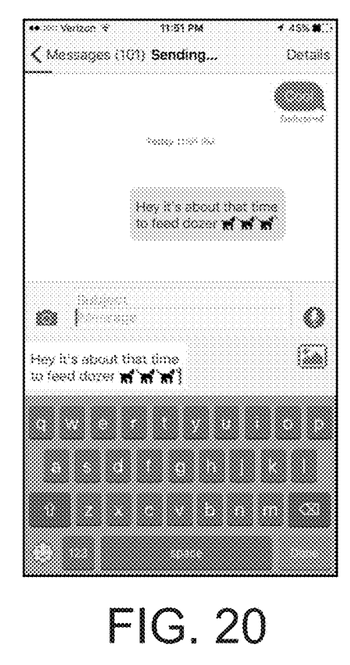
FIG. 20 is a view of a native message interface for using an in-line emoji keyboard with a user created emoji in-line with the text that is sending, in accordance with embodiments.
Figure 21:
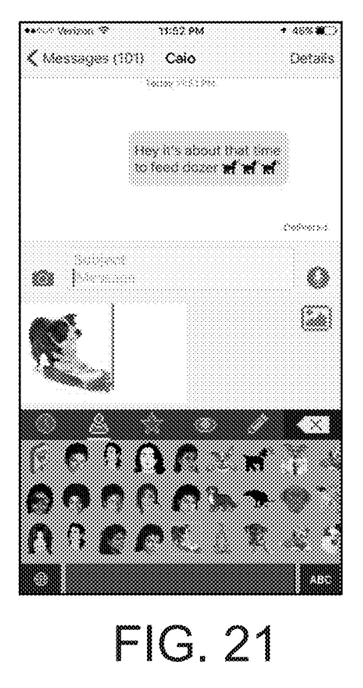
FIG. 21 is a view of a native message interface for using an in-line emoji keyboard with a user created emoji in-line with the text that has been sent and a new message with a user created emoji to be shared with another user through the native message application, in accordance with embodiments.

Embodiments of the present invention include a keyboard for use with mobile devices, wherein the keyboard includes user created emojis that can be inserted in-line with text of a native messaging application operating on the mobile device, as depicted in FIGS. 17-21. The user may open the native messaging application on a mobile device as shown in FIG. 17 and select the in-line emoji keyboard. The user may then use the in-line emoji keyboard to type text that is to be sent (See FIG. 17). The user may then select an emoji to insert (See FIG. 17) and select it any number of times to insert the emoji, which is a user created emoji, into the message having the text, as shown in FIG. 18. Once the user has completed the creation of the message, the user selects a copy to clipboard button and the text and user created emoji is converted to an image having the text and the in-line emojis saved as a single image (See FIG. 18). The image may then be pasted within the message portion of the native messaging application, as depicted in FIG. 19. The user may then select send and the created image of text with in-line user created emoji is then sent by selecting "send" as shown in FIG. 20 and then showing the message as sent, as shown in FIG. 21. As can be seen in FIG. 21, the sent message looks substantially similar to a typical message sent using the native messaging application and provides a way to send text with user created in-line emojis through the native messaging application.

In some embodiments, the user may send an emoji for another user to use through the native messaging application as shown in FIG. 21.

The following are additional components and embodiments of the system.

Create Screen

The system provides a create screen, wherein a user may start by either picking a color to draw an emoji or select a photo (camera or photo library) to turn into a high definition emoji. The grid size maybe changed between various grid sizes, such as, but not limited to 100×100 pixels, 200×200 pixels, 400×400 pixels, and the like. This allows users to achieve pixel art having low pixel count. The brush size may also be changed, thereby providing another way for the system to change grid size, such as by selecting 1×1, 2×2, 5×5 and the like brush size. The system may be employed in a touch screen environment. A long hold, such as a user holding her finger down on an area in the grid for an extended period, 3 options appear. One may be a "Fill Tool" that fills the selected area with the color you chose. The second option may be a "Select Color Tool" (which selects the color that your finger is on). The third option may be a magic eraser, which is the exact opposite of a fill tool (Deletes all of one kind of color in the area where your finger is pressed).

Press the save button in the top right of the screen to keep your creation forever and share it with the online community. You can also select the "Private" feature which makes it so only you can see the emoji.

Crop Function

When utilizing the system to convert a photo into an emoji, the user is automatically directed to a screen to crop to the portion of the photo the user desires to operate as the base for the emoji. The system provides two ways of cropping—square crop and free crop. Square crop simply crops out anything in the given square area. Free crop is where you can set many different small dots and cut out an exact image (or more abstract shape). Once finished, a soft button may be pressed to save the cropped image.

Photo Editor

A user may stamp any emojis that he or someone in the System community created. A selected emoji may be altered by flipping vertically and flipping horizontally. The system allows a user to save edits made to the photo.

Keyboard

A keyboard according to an embodiment includes a menu for "Recently Used Emojis," to view all of the emojis the user created, a "Favorite" section where all of the emojis that the user favorited appear, a "Browse" area where a user can see the most popular emojis on the community, view friends emojis or search for any emojis to type with or stamp on a photo, and/or a "Create" area where you can create a brand new emoji.

As described above, a user can use the system to send created emojis through native text messaging applications. The user can also stamp photos directly from this keyboard app by pressing a corresponding button.

Unlike any other app PixelChat allows you to have both emojis and text in one message together. Even though this is technically restricted by Apple, we found a loophole. Since we're not technically sending emojis and text together in a text message we simply found a way around that by putting the text and emojis together in an image file instead.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Any flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An in-line emoji keyboard for use with mobile devices comprising:
    a mobile computing device programmed to:
        activate an in-line emoji keyboard within a native messaging application of the mobile computing device in response to receiving a user selection of the in-line emoji keyboard;
        enter text using the in-line emoji keyboard;
        select and enter a user created emoji in-line with the entered text using the in-line emoji keyboard, wherein selection of the user created emoji opens a separate text box having the entered text and the selected user created emoji in-line with the entered text;
        automatically create an image including the user entered text and user created emoji in-line with the entered text as depicted in the separate text box in response to receiving a user selection of create message, such that the image appears seamless as only text and at least one in-line user created emoji, wherein the in-line user created emoji is automatically sized to correspond to the size of the user entered text prior to creating the image;
        automatically paste within the native messaging text area the created image including the user entered text and user created emoji in-line with the entered text; and
        send the created image including the user entered text and user created emoji in-line with the text using the native messaging application in response to receiving a user selection of sending the message.

2. The in-line emoji keyboard of claim 1, wherein the user created emoji is a pixel art emoji.

3. The in-line emoji keyboard of claim 2, wherein the pixel art emoji is formed in a grid size of 100 pixels by 100 pixels.

4. The in-line emoji keyboard of claim 2, wherein the pixel art emoji is formed in a grid size of 200 pixels by 200 pixels.

5. The in-line emoji keyboard of claim 2, wherein the pixel art emoji is formed in a grid size of 400 pixels by 400 pixels.

6. The in-line emoji keyboard of claim 1, wherein the user created emoji is a cropped and edited photo.

7. An in-line emoji keyboard for use with mobile devices comprising:
    a mobile computing device programmed to:
        activate an in-line emoji keyboard within a native messaging application of the mobile computing device in response to receiving a user selection of the in-line emoji keyboard;
        enter text using the in-line emoji keyboard;
        select and enter a user created pixel art emoji in-line with the entered text using the in-line emoji keyboard, wherein selection of the user created emoji opens a separate text box having the entered text and the selected user created emoji in-line with the entered text;
        automatically create an image including the user entered text and user created pixel art emoji in-line with the entered text as depicted in the separate text box in response to receiving a user selection of create message, such that the image appears seamless as only text and at least one in-line user created emoji, wherein the in-line user created emoji is automatically sized to correspond to the size of the user entered text prior to creating the image;
        automatically paste within the native messaging text area the created image including the user entered text and user created pixel art emoji in-line with the entered text; and
        send the created image including the user entered text and user created pixel art emoji in-line with the text using the native messaging application in response to receiving a user selection of sending the message.

8. The in-line emoji keyboard of claim 7, wherein the pixel art emoji is formed in a grid size of 100 pixels by 100 pixels.

9. The in-line emoji keyboard of claim 7, wherein the pixel art emoji is formed in a grid size of 200 pixels by 200 pixels.

10. The in-line emoji keyboard of claim 7, wherein the pixel art emoji is formed in a grid size of 400 pixels by 400 pixels.

11. An in-line emoji keyboard for use with mobile devices comprising:
    a mobile computing device programmed to:
        activate an in-line emoji keyboard within a native messaging application of the mobile computing device in response to receiving a user selection of the in-line emoji keyboard;
        enter text using the in-line emoji keyboard;
        select and enter a user created emoji in-line with the entered text using the in-line emoji keyboard, wherein selection of the user created emoji opens a separate text box having the entered text and the selected user created emoji in-line with the entered text;
        automatically create an image including the user entered text and user created emoji in-line with the entered text as depicted in the separate text box in response to receiving a user selection of create message, such that the image appears seamless as only text and at least one in-line user created emoji, wherein the in-line user created emoji is automatically sized to correspond to the size of the user entered text prior to creating the image; and paste within the native messaging text area the created image including the user entered text and user created emoji in-line with the entered text for sending.

* * * * *